United States Patent [19]

Morikawa et al.

[11] Patent Number: 5,195,608
[45] Date of Patent: Mar. 23, 1993

[54] POWER PLANT FOR AUTOMOTIVE VEHICLE

[75] Inventors: Kunihiko Morikawa; Masaki Sugimoto, both of Kanagawa, Japan

[73] Assignee: Nissan Motor Co., Ltd., Yokohama, Japan

[21] Appl. No.: 744,171

[22] Filed: Aug. 13, 1991

[51] Int. Cl.$^5$ ............................................. B60K 5/04
[52] U.S. Cl. ............................. 180/297; 123/195 AC
[58] Field of Search ..................... 180/297, 292, 248; 123/195 A, 195 R

[56] References Cited

U.S. PATENT DOCUMENTS

| | | | |
|---|---|---|---|
| 2,328,518 | 8/1943 | Wahlberg et al. | 180/292 |
| 3,204,717 | 9/1965 | Collins | 180/292 |
| 4,690,238 | 9/1987 | von Sivers | 180/297 |
| 4,779,701 | 10/1988 | Tsuchiya et al. | 180/297 |
| 4,821,826 | 4/1989 | Lings | 180/297 |
| 5,070,830 | 12/1991 | Malven et al. | 123/195 A |

FOREIGN PATENT DOCUMENTS

0188626 7/1990 Japan ............................... 123/195 A

OTHER PUBLICATIONS

"Newly Compiled Automotive Vehicle Engineering Handbook", vol. 5, pp. 1-10, FIG. 1-21.

Primary Examiner—David M. Mitchell
Attorney, Agent, or Firm—Lowe, Price, LeBlanc & Becker

[57] ABSTRACT

A power plant for a front engine front drive type automotive vehicle. The power plant is comprised of a forward and transversely mounted engine having a cylinder block with which a transaxle is joined through a plurality of joining points with bolts. The final drive unit of the transaxle includes a differential and projects laterally from the transmission. The center axis of the differential is offset low relative to the center axis of a crankshaft of the engine. The engine is disposed to incline rearward relative to the vehicle such that the inclination of the bottom face of the cylinder block relative to a horizontal plane is larger than the inclination of a line connecting the differential center axis and the differential center axis relative to the horizontal plane, thereby rigidly supporting the final drive unit.

17 Claims, 4 Drawing Sheets

POWER PLANT FOR AUTOMOTIVE VEHICLE

BACKGROUND OF THE INVENTION

1. Field of the Invention

This invention relates to improvements in a power plant for an automotive vehicle, and more particularly to a locational relationship between a transaxle and an engine in a front engine front drive type automotive vehicle.

2. Description of the Prior Art

In a power plant for an autmotive vehicle of the front engine front drive type, it is well known that a transmission and a final drive unit including a differential are combined to form a transaxle which is joined with an engine, in which the final drive unit projects laterally from the transmission. It is usual to offset the center axis of the differential below the center axis of a crankshaft for the purpose of preventing its interference with other parts around the engine.

Thus, the center axis of the differential lies far from and lower than the crankshaft axis, and therefore the projecting final drive unit cannot be effectively rigidly supported so as to be allowed to vibrate particularly under upward and downward flexural vibrations. This degrades the upward and downward flexural vibration characteristics of the entire power plant. To this problem, it has been proposed to increase the thickness of the housing of the power plant or to increase the number of connection points for joining the engine to the transaxle. However, such measures unavoidably increase the weight of the power plant while lowering the operational efficiency in assembly of the power plant.

SUMMARY OF THE INVENTION

It is an object of the present invention to provide an improved power plant for an automotive vehicle, which is remarkably high in rigidity against upward and rearward flexural vibrations applied to the power plant while preventing noise generation due to such vibrations.

Another object of the present invention is to provide an improved power plant for an automotive vehicle, having a of the housing of reduced thickness and fewer connection points for joining a transaxle to the engine.

A power plant of the present invention for an automotive vehicle is comprised of an engine including a cylinder block having a bottom face to which an oil pan is secured. The engine further includes a crankshaft having an axis on which a crank center resides on a vertical plane perpendicular to the crankshaft axis. A transaxle is fixed to the cylinder block and includes a transmission and a final drive unit including a differential. The differential has a differential center residing on the vertical plane. The differential center is located below the crank center. Additionally, the engine is inclined such that an inclination of the cylinder block bottom face relative to a horizontal plane is larger than that of a line connecting the crank center and the differential center, relative to the horizontal plane.

Accordingly, the center of gravity of the final drive unit is located between one of lower opposite connection points (near the cylinder block bottom face) and one of upper opposite connection points (above the lower ones) of the cylinder block. Through these connection points, the transaxle is joined with the cylinder block. Therefore, the rigidity of the final drive unit projecting laterally from the transmission is noticeably raised against upward and downward flexural vibrations, thereby increasing the rigidity of the entire power plant against flexural vibrations. As a result, generation of gear noise and booming noise due to flexural vibration can be effectively suppressed.

BRIEF DESCRIPTION OF THE DRAWINGS

In the drawings, like reference numerals designate like elements and parts throughout all the figures.

DETAILED DESCRIPTION OF THE INVENTION

Figure 1A:
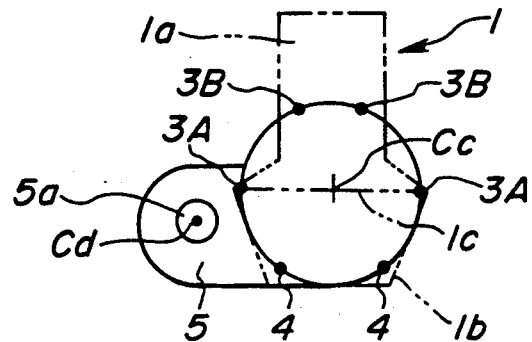
FIG. 1A is a schematic side view of a conventional power plant for an automotive vehicle.
Figure 1B:
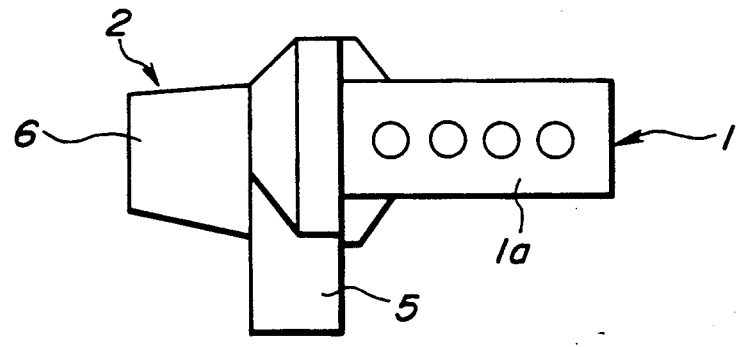
FIG. 1B is a schematic plan view of the conventional power plant of FIG. 1A.
Figure 1C:
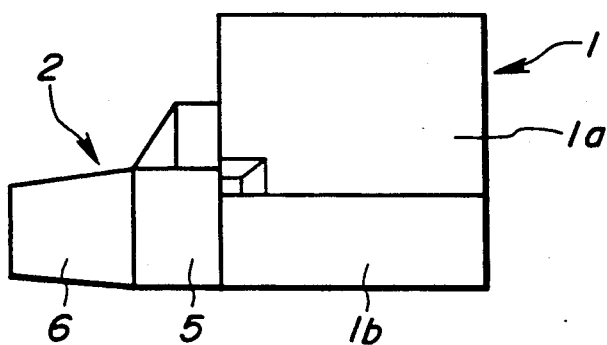
FIG. 1C is a schematic front elevation of the conventional power plant of FIG. 1A.

To facilitate the understanding of the present invention, a brief reference will be made to a conventional power plant, depicted in FIGS. 1A, 1B and 1C. The conventional power plant is for a front wheel front drive type automotive vehicle. The power plant includes a forward and transversely mounted engine 1 with which a so-called transaxle 2 is combined. The transaxle 2 includes a final drive unit 5 and a transmission 6 which are combined with each other to a single unit. The final drive unit 5 includes a differential. Such an arrangement is disclosed, for example, in a Japanese technical document "Newly Compiled Automotive Vehicle Engineering Hnadbook", fifth volume, Page 1-10, FIG. 1-21 (published in June, 1983 by Automotive Vehicle Engineering Association in Japan).

The engine 1 of such a power plant includes a cylinder block 1a which has bottom face 1c to which an oil pan 1b is secured. Cylinder block 1a is fixed to the upper peripheral portion of an end face of the housing of the transmission 6. More specifically, engine 1 is joined at one end with the transmission 6 at lower connection points 3A, 3A and at upper connection points 3B, 3B. Points C points 3A, 3A are located at opposite side portions of cylinder block 1a and near the bottom face 1c of the cylinder block 1a.

A pair of axle shafts 5a extend oppositely from the final drive unit 5 and drivingly connect respectively with front wheels (not shown) so that the front wheels are driven. The axle shafts 5a are usually located lower in level to prevent interference with other parts of the engine. Accordingly, a differential center (the center of the differential) Cd is offset to be located lower than a crank center (the center of a crankshaft) Cc.

However, the following drawbacks have been encountered in the above conventional power plant: Since the cylinder block 1a is disposed generally perpendicular, the center of gravity approximately at the differential center Cd) of the final drive unit 5 projecting from transmission 6 is unavoidably far beyond the lower and upper connection points 3A, 3B of the cylinder block 1a. Accordingly, the final drive unit 5 cannot be securely and rigidly supported and readily vibrates under upward and downward flexural vibrations. This deteriorates upward and downward flexural vibration characteristics of the whole power plant.

To solve these problems, oil pan 1b may be formed of thick and rigid aluminum secured at connection points 4, 4 to the lower peripheral portion of the housing of the transaxle 2 as shown in Figure to thereby suppress flexural vibrations. Additionally, for the same purpose, the thickness of the housing of the whole power plant may be increased. However, these measures will increase the weight of the power plant and deteriorates the operation efficiency in an assembly process of the power unit because of an increase in the number of the connection points between the engine 1 and the transaxle, raising the production cost of the power plant.

Figure 2A:
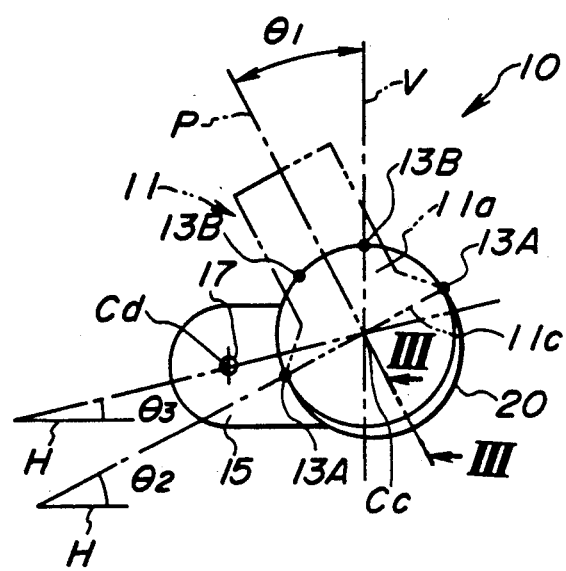
FIG. 2A is a schematic side view of an embodiment of a power plant for an automotive vehicle, in accordance with the present invention.
Figure 2B:
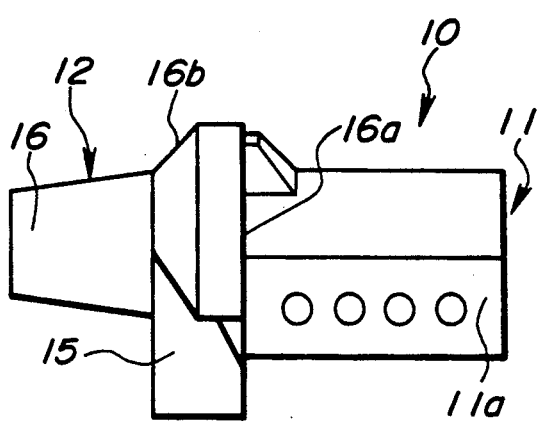
FIG. 2B is a schematic plan view of the power plant of FIG. 2A.
Figure 2C:
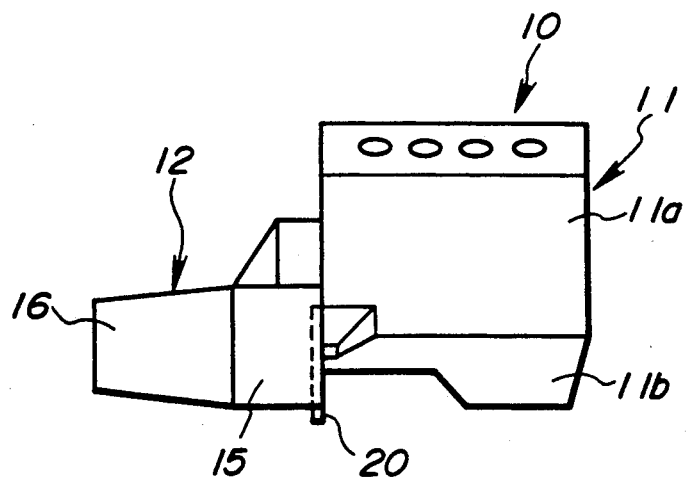
FIG. 2C is a schematic front elevation of the power plant of FIG. 2A.

Reference is now made to FIGS. 2A to 2C, wherein an embodiment of a power plant, according to the present invention, for an automotive vehicle of the front engine front wheel drive type, is identified with reference numeral 10, and comprises a forward and transversely mounted engine 11. A transaxle 12 is fixed to engine 11 and includes a final drive unit 15 and a transmission 16 which are combined with each other to form a single unit. The final drive unit 15 includes a differential (not identified).

Engine 11 further includes a cylinder block 11a having a bottom surface 11c to which an oil pan 11b is fixedly secured. The cylinder block 11a is fixedly secured or joined at its left end face (in FIGS. 2B and 2C) with the right end face (in FIGS. 2B and 2C) 16a of the housing 16b of transmission 16 at lower points 13A, 13A and upper joint points 13B, 13B. At the joining points 13A, 13B, bolts (not shown) rigidly connect the cylinder block 11a to transmission 16. The housing right end 16a of transmission 16 is formed circular and flat to be fitted to the left end of the cylinder block 11a. The lower points 13A, 13A are located at the opposite side end portions of the cylinder block 11a and formed through the left end face of the cylinder block. The lower points 13A, 13A are positioned near the bottom face 11c of the cylinder block 11a. The lower points 13A, 13A are positioned far from and opposite to each other with respect to a center plane P of cylinder block 11a which plane passes through the axis of a crankshaft (not shown) of the engine 11. The upper points 13B, 13B are located considerably above and far from lower points 13A, 13A. The upper points 13B, 13B are positioned opposite or symmetrical to each other with respect to the cylinder block center plane P and located near the side surfaces of the cylinder block.

As shown in FIGS. 2A and 2B, the final drive unit 15 projects in a side direction from the transmission 16 and has a differential center Cd which resides on the center axis of the differential. A pair of axle shafts 17 extend from final drive unit 15 with their axes aligned with the differential center axis (Cd). Shafts 17 are drivingly connected respectively with a pair of front wheels so that the front wheels are driven, though not shown. In order to prevent interference of the axle shafts 17 with other parts around the final drive unit 15, the differential center Cd is offset low relative or positioned lower than the crank center Cc which resides on the axis of the crankshaft of the engine 11 on the same vertical plane on which the differential center Cd resides.

In this embodiment, the cylinder block 11a is inclined relative to transaxle 12 in such a manner that the center plane P thereof inclines toward the rear of the vehicle. More specifically, center plane P of the cylinder block 11a forms a first inclination angle $\theta_1$ between it and a vertical plane V which is vertical to the ground (not shown). Furthermore, a second inclination angle $\theta_2$ of the bottom face 11c of the cylinder block 11a relative to a horizontal plane H (perpendicular to the vertical plane V) is larger than a third inclination angle $\theta_3$ of a line connecting the differential center Cd and the crank center Cc relative to the horizontal plane H. The crank center Cc resides on the center axis of the crankshaft on the same vertical plane on which the differential center Cd resides.

Figure 3:
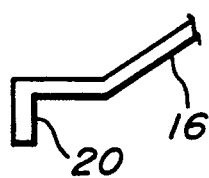
FIG. 3 is a fragmentary view taken in the direction of arrows substantially along the line III—III in FIG. 2A.

The circular end 16a of transmission housing 16b is integrally extending with a generally cresecent-shaped rib 20 formed along the periphery thereof and located below the cylinder block bottom face 11c. The rib 20 is shaped as shown in FIG. 3 to increase the rigidity of the lower part of the circular end 16a of the transmission 16.

With the above arranged power plant for the front wheel drive vehicle, the cylinder block 11a is inclined such that the inclination of the bottom face 11c thereof is larger than that of the line connecting the differential center Cd and the crank center Cc. Therefore, the differential center Cd or the center of gravity of the final drive unit 15 is positioned between the upper and lower connection points (at which bolts are disposed) on the side of the final drive unit. This largely increases the rigidity of the final drive unit 15 projecting from the transmission 16 against the upward and downward flexural, thereby effectively improving the rigidity of the whole power plant 10 against upward and downward flexural vibrations. Accordingly, it is made possible to use an inexpensive sheet metal as the material of the oil pan 11b without using expensive aluminum, thereby lowering the production cost of the power plant 10 while achieving a lighter weight power plant 10.

Additionally, forming rib 20 at the peripheral portion of the joined end of the transmission increases the rigidity of the transmission there at without requiring a bolted connection point for the oil pan thereby reducing the number of connection points. Such a reduced number of joining points improves the operational efficiency during an assembly. In other words, in the conventional power plant as shown in FIG. 1A, the further connection points 4,4 are required at locations below the bottom face 1c of the cylinder block 1a for the oil pan 1b. On the contrary, according to the embodiment of the present invention, such points 4, 4 are omitted.

Figure 4A:
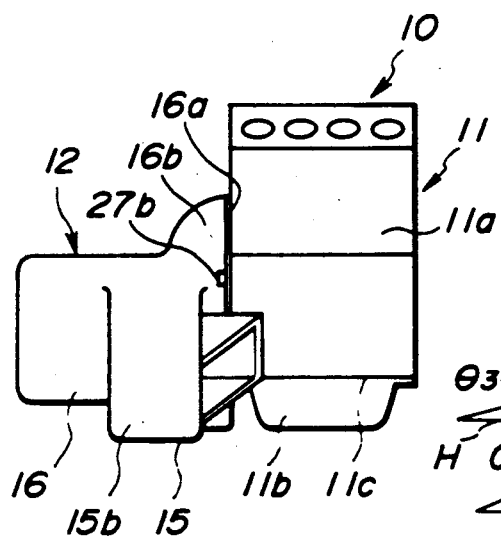
FIG. 4A is a schematic front elevation of another embodiment of the power plant in accordance with the present invention.
Figure 4B:
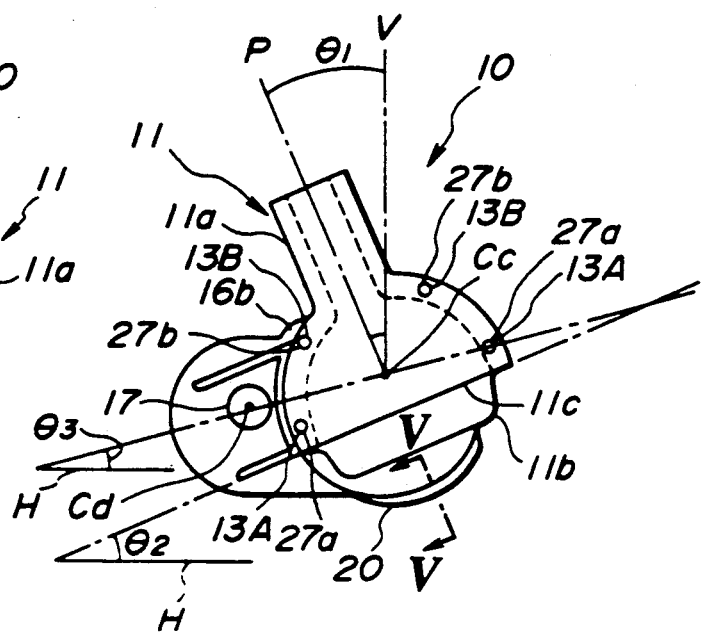
FIG. 4B is a schematic side view of the power plant of FIG. 4A.
Figure 4C:
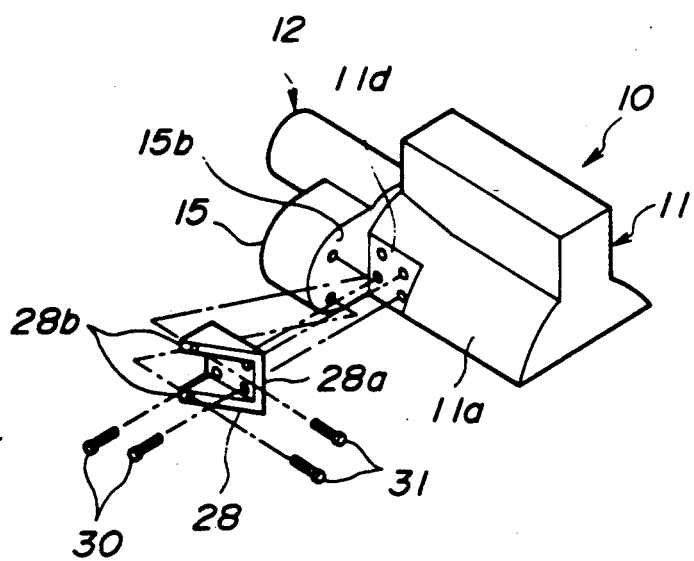
FIG. 4C is a schematic perspective view of the power plant of FIG. 4A.
Figure 5:
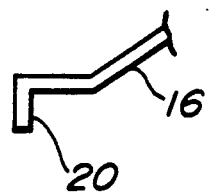
FIG. 5 is a fragmentary view taken in the direction of the arrows substantially along the line V—V in FIG. 4B.

FIGS. 4A, 4B and 4C illustrate another embodiment of the power plant 10 in accordance with the present invention, which is similar to the embodiment of FIGS.

2A to 2c. In this embodiment, two lower bolts 27a, 27a are shown to serve respectively as the two lower connection points 13A, 13A, and two upper bolts 27b, 27b are shown to serve respectively as the two upper connection points 13B, 13B. It will be understood that each bolt 27a, 27b is disposed to pass through a portion of the housing 16b of the transmission 16 and a portion of the cylinder block 11a.

In this embodiment, as best shown in FIG. 4C, a stay 28 is fixedly disposed to connect the cylinder block 11a and the casing 15b of the final drive unit 15 including the differential to increase a connection rigidity between them. Stay 28 has a generally C-shaped cross-section and therefore has a flat base plate section 28a filed to a flat seat surface 11d formed on side surface of the cylinder block 11a with bolts 30 screwed in the block. The stay 28 further has two parallel wall or plate sections 28b, 28b which are integral with the opposite ends of the flat base plate section 28a and separate from each other to define a space therebetween. The two wall sections 28b, 28b are fixed to the casing 15b of final drive unit 15 with bolts 31 screwed in the casing 15b. Each wall section 28b is triangular shaped as viewed from the vertical direction of cylinder block 11a. As shown in FIG. 4B, axle shaft 17 is positioned in the space between the opposite wall sections 28b, 28b.

By virtue of stay 28, the connection rigidity between the cylinder block 11a and the final drive unit casing 15b is increased, which allows the thickness of the housing and casing forming part of the power plant to be reduced in cooperation with the effect of the increased rigidity of the final drive unit 15, thus achieving a large weight reduction of the power plant 10.

Figure 6:
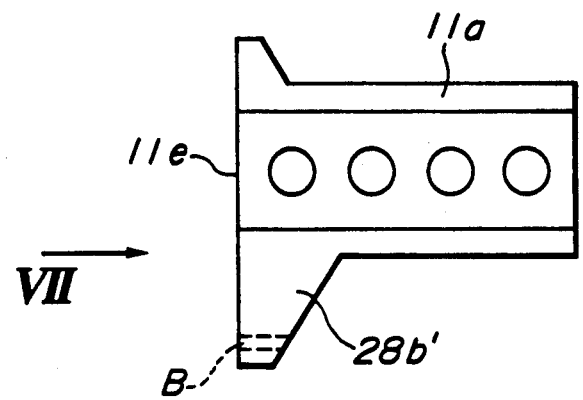
FIG. 6 is a schematic front view of a cylinder block of a further embodiment of the power unit in accordance with the present invention.
Figure 7:
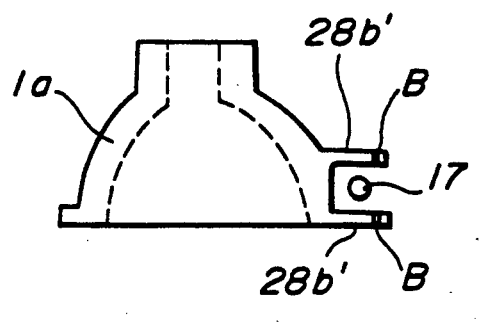
FIG. 7 is a schematic side view of the cylinder block of FIG. 6 as viewed from a direction of an arrow VII.

FIGS. 6 and 7 illustrate a further embodiment of the power plant 10 in accordance with the present invention, similar to the embodiment of FIGS. 4A, 4B and 4C with the exception that a stay part 28' similar to stay 28 is formed integral with the cylinder block 11a and located flush with the end face 11e of cylinder block 11a; face 11e is in contact with transmission 16. The stay section 28' includes opposite spaced parallel wall or plate sections 28b', 28b' so that axle shaft 17 from the final drive unit 15 passes through a space formed there between. The stay part 28' is formed integral with the cylinder block 11a during casting of the cylinder block 11a. The plate sections 28b', 28b' are formed respectively with bolt holes B, B through each of which a bolt is screwed into the casing of the final drive unit.

By virtue of using the thus integrally formed stay part 28', the jointing operation of the cylinder block 11a and the transaxle 12 can be facilitated, thereby improving the operation efficiency during an assembly process of the power plant 10.

What is claimed is:

1. A power plant for an automotive vehicle, comprising:
   an engine including a cylinder block having a bottom face to which an oil pan is secured, and a crankshaft having an axis on which a crank center resides on a vertical plane perpendicular to the crankshaft axis;
   a transaxle fixedly joined with said cylinder block and including a transmission and a final drive unit including a differential having a differential center residing on said vertical plane, said differential center being located below said crank center;
   means for mounting said engine at an inclined angle such that an inclination angle of said cylinder block bottom face, relative to a horizontal plane, is greater than another inclination angle of a line connecting said crank center and said differential center, relative to said horizontal plane; and
   a flange including a reinforcement rib formed integral with said transmission and located at an outer peripheral surface of said transmission, said rib being located below a level of said cylinder block bottom face and projecting along a plane perpendicular to the axis of the crankshaft, said rib extending from the vicintiy of the cylinder block bottom face on a first side of the cylinder block to the vicinity of the cylinder block bottom face on a second side of the cylinder block, said first and second sides being opposite to each other with respect to a center plane of said cylinder block which center plane is perpendicular to the cylinder block bottom face.

2. A power plant as claimed in claim 1, further comprising means by which at least first and second connection points are defined at opposite side end portions of the cylinder block and located opposite to each other with respect to a center plane of the cylinder block which center plane passes through the axis of said crankshaft, said first and second connection points being spaced from each other and positioned near said cylinder block bottom face, said cylinder block being joined through said first and second connection points with said transmission of said transaxle.

3. A power plant as defined in claim 2, further comprising means by which third and fourth connection points are defined above said first and second connection points and located opposite to each other with respect to said cylinder block center plane, said third and fourth connection points being located spaced from each other and near side surfaces of said cylinder block, said cylinder block being joined through said third and fourth points with said transmission.

4. A power plant as claimed in claim 2, further comprising first and second bolts for joining said cylinder block and said transmission, said first and second bolts being located respectively at said first and second points.

5. A power plant as claimed in claim 3, further comprising third and fourth bolts for joining said cylinder block and said transmission, said third and fourth bolts being located respectively at said third and fourth points.

6. A power plant as claimed in claim 4, further comprising means by which said first and second points are defined through an end face of said cylinder block which end face is in contact with said transmission.

7. A power plant as claimed in claim 5, further comprising means by which said third and fourth points are defined through an end face of said cylinder block which end face is in contact with said transmission.

8. A power plant as claimed in claim 1, wherein said final drive unit projects laterally from said transmission and in a direction relative to the vehicle so that said differential center is located spaced from said cylinder block in said direction, wherein said cylinder block inclines in said direction.

9. A power plant as claimed in claim 1, further comprising a pair of axle shafts extending from said differential and drivingly connected with road wheels of the vehicle, an axis of each axle shaft being aligned with the axis of said differential, said axle shaft extending parallel with the axis of said crankshaft.

10. A power plant as claimed in claim 1, wherein a first inclination angle is defined between said cylinder block bottom face and said horizontal plane, and a second inclination angle is defined between said line and said horizontal plane, said first inclination angle being larger than said second inclination angle.

11. A power plant as claimed in claim 10, wherein an acute angle is defined between said horizontal plane and a center plane of said cylinder block which plane passes through the axis of said crankshaft.

12. A power plant as claimed in claim 1, wherein said rib is located generally flush with an end face of said transmission which end face is in contact with said cylinder block, said rib being formed crescent-shaped and extending generally parallel with said vertical plane.

13. A power plant as claimed in claim 1, further comprising a one-piece reinforcement stay member for connecting said cylinder block and a casing of said final drive unit to increase a connection rigidity between them, said stay member including a first portion fixed to said cylinder block at a part near an end face of said cylinder block in contact with said transaxle, and a second portion fixed to the casing of said final drive unit.

14. A power plant for an automotive vehicle, comprising:
   an engine including a cylinder block having a bottom face to which an oil pan is secured, and a crankshaft having an axis on which a crank center resides on a vertical plane perpendicular to the crankshaft axis;
   a transaxle fixedly joined with said cylinder block and including a transmission and a final drive unit including a differential having a differential center residing on said vertical plane, said differential center being located below said crank center;
   means for mounting said engine at an inclined angle such that an inclination angle of said cylinder block bottom face, relative to a horizontal plane, is greater than another inclination angle of a line connecting said crank center and said differential center, relative to said horizontal plane,
   further comprising a one-piece reinforcement stay member for connecting said cylinder block and a casing of said final drive unit to increase a connection rigidity between them, said stay member including a first portion fixed to said cylinder block at a part near an end face of said cylinder block in contact with said transaxle, and a second portion fixed to the casing of said final drive unit, wherein said stay member includes a first plate section fixedly secured to said part of said cylinder block and a second and third plate sections fixedly secured to said final drive unit casing, said second and third plate sections being integral with said first plate at opposite ends and spaced from each other to define a space through which an axle shaft extending from said final drive unit passes.

15. A power plant for an automotive vehicle, comprising:
   an engine including a cylinder block having a bottom face to which an oil pan is secured, and a crankshaft having an axis on which a crank center resides on a vertical plane perpendicular to the crankshaft axis;
   a transaxle fixedly joined with said cylinder block and including a transmission and a final drive unit including a differential having a differential center residing on said vertical plane, said differential center being located below said crank center;
   means for mounting said engine at an inclined angle such that an inclination angle of said cylinder block bottom face, relative to a horizontal plane, is greater than another inclination angle of a line connecting said crank center and said differential center, relative to said horizontal plane, further comprising a pair of plate section integral with said cylinder block at a location near an end face of said cylinder block which face is in contact with said transaxle, said plate sections being fixedly secured to a casing of said final drive unit and spaced from each other to define a space through which an axle shaft extending from said final drive unit passes.

16. A power plant for an automotive vehicle of a front engine front wheel drive type, comprising:
   an engine mounted forward and transversely relative to the vehicle and including a cylinder block having a bottom face to which an oil pan is fixedly secured, and a crankshaft having an axis on which a crank center resides on a vertical plane perpendicular to the crankshaft axis;
   a transaxle fixedly joined with said cylinder block and including a transmission and a final drive unit including a differential having a differential center residing on said vertical plane, said final drive unit projecting from said transmission rearward relative to the vehicle so that axle shafts extend from said differential center, said axle shafts being generally parallel with said crankshaft axis, said differential center being located below said crank center; and
   means by which said engine is inclined rearward relative to the vehicle so that an acute angle is defined between a horizontal plane and a center plane of said cylinder block passing through the crankshaft axis, an inclination of said cylinder block bottom face relative to a horizontal plane being larger than that of a line connecting said crank center and said differential center, relative to said horizontal plane; and
   a flange-like reinforcement rib formed integral with said transmission and located at an outer peripheral surface of said transmission, said rib being located below a level of said cylinder block bottom face and projecting along a plane perpendicular to the axis of the crankshaft, said rib extending from the vicinity of the cylinder block bottom face on a first side of the cylinder block to the vicinity of the cylinder block bottom surface on a second side of the cylinder block, said first and second sides being opposite to each other with respect to a center plane of said cylinder block which center plane being perpendicular to the cylinder block bottom face.

17. A power plant for an automotive vehicle, comprising:
   an engine mounted forward and transversely relative to the vehicle and including a cylinder block having a skirt section defining at its bottom portion a bottom face of said cylinder block to which face an oil pan is secured, and a crankshaft having an axis on which a crank center resides on a vertical plane perpendicular to the crankshaft axis;
   a transaxle fixedly joined with said cylinder block and including a transmission and a final drive unit including a differential having a differential center residing on said vertical plane, said transmission having an outer peripheral surface;

means for connecting said cylinder block with a first section of said transmission above the cylinder block bottom face so that a second section of said transmission below the cylinder block bottom face is free from restraint by said connecting means;

means for mounting said engine at an inclined angle such that an inclination angle of said cylinder block bottom face, relative to a horizontal plane, is greater than another inclination angle of a line connecting said crank center and said differential center, relative to said horizontal plane; and a reinforcement rib formed integral with said transmission and located at the outer peripheral surface of said transmission below the cylinder block bottom face, said rib being located below a level of said cylinder block bottom face and projecting along a plane perpendicular to the axis of the crankshaft, said reinforcement rib extending from the vicinity of the cylinder block bottom face on a first side of the cylinder block to the vicinity of the cylinder block bottom suraface on a secodn side of the cylinder block, said first and second sides being opposite to each other with respect to a center plane of said cylinder block which plane being perpendicular to the cylinder block bottom face.

* * * * *